(12) United States Patent
Brown

(10) Patent No.: US 10,474,185 B2
(45) Date of Patent: *Nov. 12, 2019

(54) TIMESTAMP ALIGNMENT ACROSS A PLURALITY OF COMPUTING DEVICES

(71) Applicant: Red Hat, Inc., Raleigh, NC (US)

(72) Inventor: Gary Peter Brown, Hitchin (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,634

(22) Filed: Jul. 16, 2018

(65) Prior Publication Data

US 2018/0321706 A1 Nov. 8, 2018

Related U.S. Application Data

(63) Continuation of application No. 14/963,358, filed on Dec. 9, 2015, now Pat. No. 10,025,346.

(51) Int. Cl.
 *G06F 1/14* (2006.01)
 *H04J 3/06* (2006.01)

(52) U.S. Cl.
 CPC .............. *G06F 1/14* (2013.01); *H04J 3/0638* (2013.01)

(58) Field of Classification Search
 CPC .................................. G06F 1/14; H04J 3/0638
 See application file for complete search history.

(56) References Cited

U.S. PATENT DOCUMENTS

| | | | |
|---|---|---|---|
| 7,590,151 B2 | 9/2009 | Middleton et al. | |
| 8,909,661 B2 | 12/2014 | Ojanpera | |
| 9,075,841 B2 | 7/2015 | Larson et al. | |
| 2009/0222557 A1* | 9/2009 | Rudy | G06F 1/14 |
| 2013/0185643 A1 | 7/2013 | Greifeneder et al. | |
| 2013/0282804 A1 | 10/2013 | Mate et al. | |
| 2013/0283296 A1 | 10/2013 | Brown | |
| 2013/0346377 A1 | 12/2013 | Barnett | |
| 2014/0280871 A1* | 9/2014 | Brown | H04L 67/22 709/224 |
| 2014/0282089 A1 | 9/2014 | West et al. | |
| 2017/0201606 A1* | 7/2017 | Ding | G06F 1/14 |

OTHER PUBLICATIONS

Rinki Chauhan et al. "Illustration of Timestamp Ordering in Controlling Concurrency in Distributed Database" http://seekdl.org/upload/files/20131208_114413.pdf, International conference on Advanced Computing, Communication and Networks'11, 2013, pp. 896-899.

(Continued)

*Primary Examiner* — Kyaw Z Soe

(74) *Attorney, Agent, or Firm* — Haynes and Boone, LLP

(57) ABSTRACT

Methods, systems, and computer program products are included for aligning timestamps of activities. A method includes receiving a first entry from a first server, the first entry corresponding to an activity, wherein the first entry includes a first timestamp corresponding to the activity. The method further includes receiving a second entry from a second serve, the second entry including a second entry corresponding to the activity, wherein the second entry includes a second timestamp corresponding to the activity. The method further includes determining an aligned timestamp of the activity by adjusting the first timestamp or the second timestamp by an offset.

20 Claims, 6 Drawing Sheets

(56) References Cited

OTHER PUBLICATIONS

"Transaction Log Synchronization Protocol for GraphDB High Availability Cluster" http://oraphdb.ontotext.com/download/attachments/47481371/GraphDB+HA+Cluster+-+Transaction+Log+Synchronization+Protocol.pdf?version=1&modificationDate=1435312241000, accessed Nov. 26, 2015, 7 pages.

Frank Pachot "SCN Synchronization in Distributed Transactions" http://blog.dbi-services.com/scn-synchronization-in-distributed-transactions/ Aug. 27, 2015, 9 pages.

* cited by examiner

TIMESTAMP ALIGNMENT ACROSS A PLURALITY OF COMPUTING DEVICES

PRIORITY INFORMATION

This application is a continuation of U.S. patent application Ser. No. 14/963,358 filed Dec. 9, 2015 entitled, "Timestamp Alignment Across a Plurality of Computing Devices," the disclosure of which is hereby incorporated by reference in its entirety.

BACKGROUND

Conventionally, transactions may be conducted across a plurality of computing devices, such as servers. These transactions often include component parts, which may be referred to as services or activities. For example, a first server may receive a request to perform a first activity corresponding to a transaction and a second server may receive a request to perform a second activity corresponding to the transaction.

The servers may record timestamps in transaction management information that identify dates and/or times corresponding to the start and/or end times of portions of the transaction. These timestamps may assist in evaluating the concept of time for performing portions of the transaction and/or the transaction as a whole. For example, it may be desirable to evaluate the timestamps for each activity performed for a transaction to determine total time duration of the transaction.

The timestamps captured across multiple servers may not be aligned. That is, issues such as network latency and non-synchronized server clocks may cause the recorded timestamps to be inconsistent across multiple computing devices. Accordingly, the timestamps that are recorded in transaction management information for the transactions may not provide accurate readings of the times corresponding to the transactions.

Therefore, a need exists for systems and techniques to improve the accuracy and/or consistency of timestamps provided by computing devices. Thus, while existing timestamp techniques corresponding to transactions performed by computing devices have been generally adequate, limitations remain.

BRIEF SUMMARY

According to an example, a computer-implemented method for creating a data structure includes receiving a first data structure from a first server, the first data structure including a first node corresponding to an activity, wherein the first node includes a first identifier corresponding to the activity, a first timestamp corresponding to the activity, and a first time duration corresponding to the activity; receiving a second data structure from a second server, the second data structure including a second node corresponding to the activity, wherein the second node includes a second identifier corresponding to the activity and a second time duration corresponding to the activity; and creating a third data structure that includes at least a portion of the first data structure and at least a portion of the second data structure, the creating including: matching the first identifier and the second identifier; creating a third node corresponding to the activity in the third data structure; and associating a second timestamp with the third node, wherein the second timestamp is different than the first timestamp.

According to an example, a non-transitory computer-readable medium includes computer-readable instructions executable by a processor to cause the processor to: receive a first data structure, the first data structure including a first node corresponding to an activity, wherein the first node includes a first identifier corresponding to the activity and a first timestamp corresponding to the activity; receive a second data structure, the second data structure including a second node corresponding to the activity, wherein the second node includes a second identifier corresponding and a second timestamp corresponding to the activity; include a node in a third data structure, the node corresponding to the activity; and associate a second timestamp with the node, wherein the second timestamp is different than the first timestamp.

According to an example, a system includes a processor and a non-transitory computer-readable storage medium; a data structure stored in the non-transitory computer-readable storage medium, the data structure including a node corresponding to an activity, the processor to associate a timestamp with the node, and the data structure including one or more nodes corresponding to a first data structure received from a first computing device and a second data structure received from a second computing device, wherein the first data structure includes a first node corresponding to the activity, wherein the first node includes a first identifier corresponding to the activity, a first timestamp corresponding to the activity, and a first time duration corresponding to the activity, wherein the second data structure includes a second node corresponding to the activity, wherein the second node includes a second identifier corresponding to the activity and a second time duration corresponding to the activity, and wherein the timestamp is different than the first timestamp.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
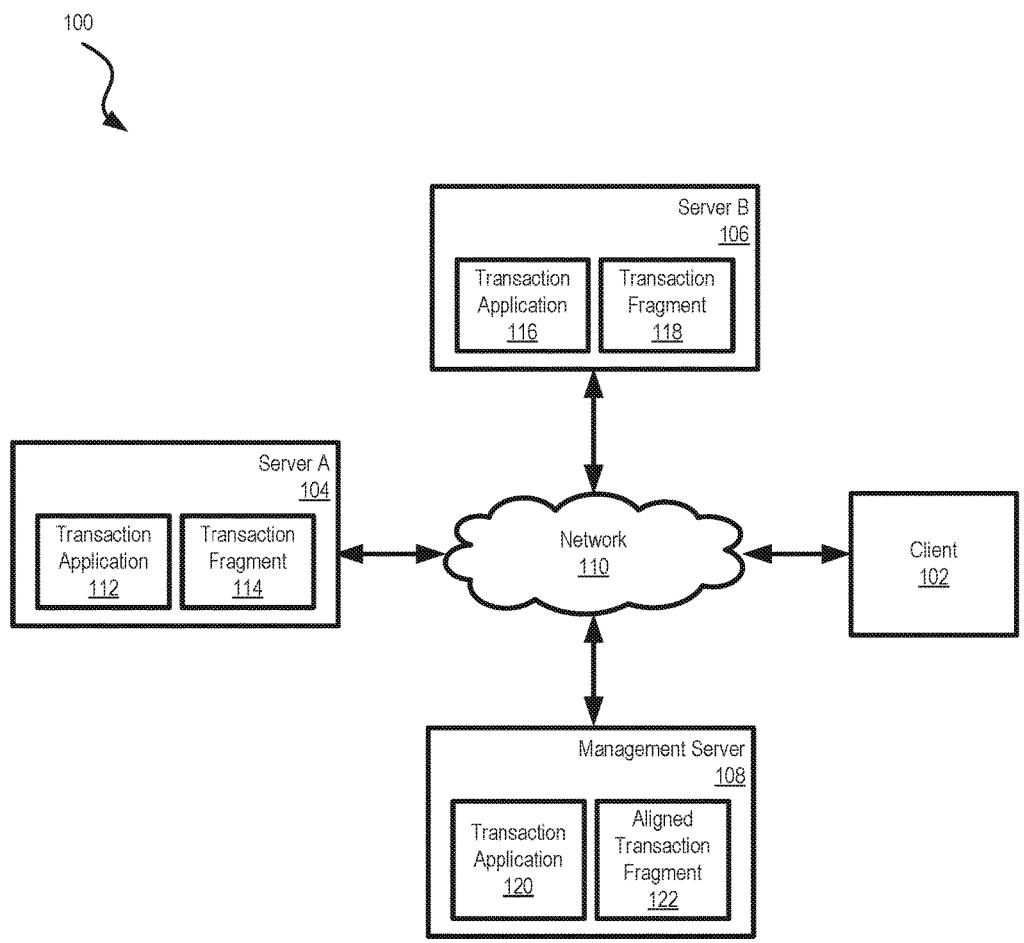
FIG. 1 is a block diagram illustrating a system architecture for aligning timestamps, in accordance with various examples of the present disclosure.

FIG. 1 illustrates a system architecture 100 for aligning timestamps, in which examples of the present disclosure can be implemented.

System architecture 100 includes a client 102. The client 102 is structured as a computing device, such as a rack mount server, desktop computer, laptop computer, or other computing device. While one client 102 is illustrated, in some examples there may also be other clients in addition to the client 102.

The client 102 is structured to generate transaction requests, which are sent to server A 104 and/or server B 106. Server A 104 and server B 106 are structure to receive the transaction requests, and to perform processing based on the transaction requests. Server A 104 and server B 106 are each structured as one or more computing devices. A computing device may be, for example, a rack mount server, desktop computer, laptop computer, or other computing device. In some examples, server A 104 and/or server B 106 are each structured as a cluster of computing devices.

The client 102, server A 104, and server B 108 are structured to communicate the transaction requests over a network 110. In the present example, the network 110 may include one or more sub-networks. For example, client 102 may be connected to server A 104 via one or more internet networks, while server A 104 and server B 106 may include a plurality of computing devices that are connected via one or more intranet networks. The network 110 may include any combination of public and/or private networks. The network 110 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

Server A 104 includes a transaction application 112 that is structured to process a transaction corresponding to the request received from the client 102. For example, the transaction processing may include querying data, retrieving data, storing data, or other data processing operation. Transactions and activities corresponding to the transactions may include any number of various transactions and activities. The following are merely a few examples of transactions and activities.

In some examples, a transaction may correspond to an inventory query request that is initiated by the client 102. In this example, server A 104 receives the inventory query request, and processes the inventory query request with the transaction application 112 to generate activities corresponding to the inventory query request. For example, a first activity may include querying an inventory dataset that is stored corresponding to server A 104. A second activity may include querying an inventory dataset that is stored corresponding to server B 106. Accordingly, server A 104 may send a transaction request to server B 106 so that server B 106 may perform the second activity to query the inventory dataset corresponding to server B 106.

In other examples, queries performed on the various servers may correspond to other types of data rather than inventory data. For example, a transaction may correspond to any type of query operation that may include sub-query activities that are performed on separate servers. For example, server A may process the transaction by performing a first query activity by the transaction application 112, and send a request to server B 106 for server B to perform a second query activity by transaction application 116. Server B 106 may then send server A 104 the results of the second query activity such that server A 104 may aggregate the query results of the first query activity and the second query activity. Server A 104 may then return the aggregated query results to the client 102.

In yet other examples, the transaction may correspond to an order of a product. For example, client 102 may send to server A 104 a transaction request corresponding to a product order. The transaction application 112 may receive the request and perform a first activity corresponding to the product order. For example, the first activity may be to query a data store to determine that the product is available. In this example, server B 106 is a server that processes a different portion of the transaction. For example, server B 106 may be structured as a credit check server. Accordingly, server A 104 may generate a transaction request for server B 106 to perform a second activity corresponding to the transaction, where the second activity is to perform a credit check corresponding to the purchaser of the product. Server A 104 may send the transaction request to server B 106. The transaction application 116 of server B 106 may receive the transaction request, and perform the second activity. For example, the transaction application 116 may perform the second activity by querying a credit score database, verifying a credit card number, or other credit-related activity. The transaction application 116 may then send the result of the credit check to server A 104, so that server A 104 may determine whether to continue processing the transaction or to terminate the transaction.

As discussed in the above examples, there may be various different types of transactions that may be performed by the computing devices of the system 100. As discussed, these transactions may be divided into components, referred to as activities, which may be performed on one or more of the computing devices of the system 100.

During the transaction processing, server A 104 and server B 106 are structured to collect and store information corresponding to the transactions and the activities. This information is included in transaction fragment 114 and transaction fragment 118. In some examples, this information is referred to as transaction management information.

In the present example, server A 104 is structured to create an entry in the transaction fragment 114 corresponding to each activity of the transaction that is performed by server A 104 or that is sent from server A 104 to another server (e.g., server B 106). For example, when server A 104 receives a transaction request from the client 102, server A may create the transaction fragment 114 to represent the transaction. If server A 104 performs a first activity corresponding to the transaction, server A 104 may create a first entry in the transaction fragment 114 to represent the first activity. If the server A 104 sends a transaction request to server B 106 to perform a second activity, server A 104 may create a second entry in the transaction fragment 114 that corresponds to the second activity.

In the present example, server B 106 is structured to create a transaction fragment 118, which may be created when server B 106 receives a transaction request from server A 104 to perform an activity corresponding to the transaction. For example, if server A 104 sends a transaction request to server B 106 to perform a second activity of the transaction, server B 106 may create an entry in the transaction fragment 118 that corresponds to the second activity.

Server A 104 and server B 106 are structured to send transaction fragments 114 and 118 to the management server 108 via the network 110. Management server 108 is structured as one or more computing devices. A computing device may be, for example, a rack mount server, desktop computer, laptop computer, or other computing device. In some examples, management server 108 is structured as a cluster of computing devices, which may be coupled via network 110.

Management server 108 includes a transaction application 120 that is structured to receive the transaction fragments 114 and 118 from the servers. The transaction application 120 is structured to aggregate the transaction fragments 114 and 118 into an aligned transaction fragment 122. The aligned transaction fragments 122 are structured to include the activities specified in entries of the transaction fragment 114 and the transaction fragment 118.

For example, server A 104 may perform a first activity corresponding to a transaction and create a first activity entry in transaction fragment 114. Server A 104 may send a transaction request corresponding to the transaction to server B 106, for server B 106 to perform a second activity. Server A 104 may create a second activity entry corresponding to the transaction request in transaction fragment 114. Server B 106 may receive the transaction request from server A 104 and perform the second activity. Server B 106 may create an entry in the transaction fragment 118 corresponding to the second activity.

In the example described above, the transaction application 120 is structured to parse the received transaction fragments 114 and 118 to aggregate the activities corresponding to the transaction into the aligned transaction fragment 122. The aligned transaction fragments 122 is structured to include entries corresponding to the activities included in the transaction fragments 114 and 118, which in the present example would include the first activity performed by server A 104 as well as the second activity performed by server B 106.

While a first activity and a second activity are described above, there may be any number of activities performed by any number of servers. For example, server B 106 may send transaction requests to other servers and create entries in the transaction fragment 118 corresponding to the transaction requests.

Figure 2A:
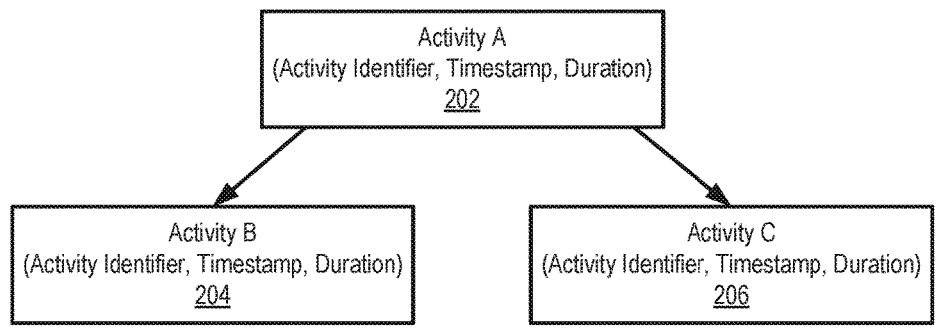
FIG. 2A is a block diagram illustrating an example layout of a transaction fragment at a first computing device, in accordance with various examples of the present disclosure.
Figure 2B:
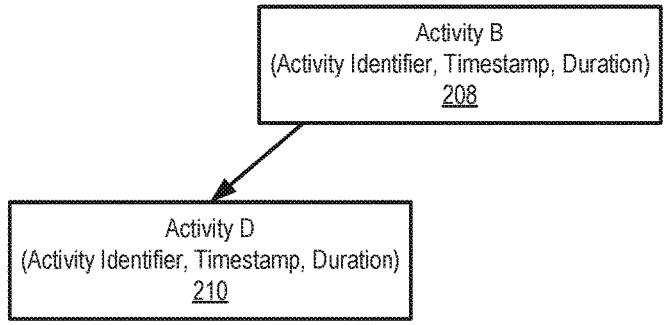
FIG. 2B is a block diagram illustrating an example layout of a transaction fragment at a second computing device, in accordance with various examples of the present disclosure.
Figure 2C:
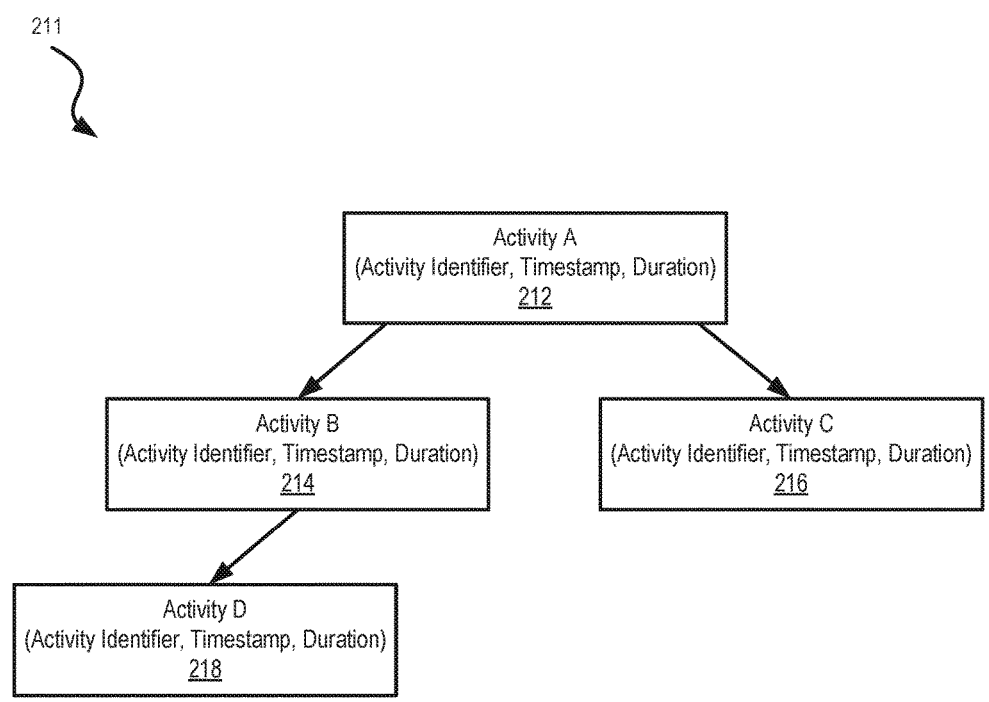
FIG. 2C is a block diagram illustrating an example layout of an aligned transaction fragment at a management computing device, in accordance with various examples of the present disclosure.

Transaction fragment data structures that store information corresponding to transactions, such as activity entries, are discussed in more detail with respect to FIGS. 2A, 2B and 2C.

FIG. 2A illustrates an example layout of a transaction fragment 200 at a first computing device, in accordance with various examples of the present disclosure.

In the present example, the transaction fragment 200 is stored at a first computing device. In some examples, the transaction fragment may be a hierarchical data structure, such as a tree data structure, that includes parent and child nodes. The hierarchical data structure may be structured to associate an activity with its component activities by including the component activities as child nodes. For example, an activity that spawns additional activities may be a parent node, with the spawned additional activities being the child nodes.

In other examples, the transaction fragment 200 may be a non-hierarchical data structure. The transaction fragment 200 may include activity entries stored in a database, flat file or other data structure. For example, each activity corresponding to a transaction may be included in a row of a database table. Entries corresponding to activities in a transaction fragment may also be referred to as nodes.

The transaction fragment 200 includes an entry 202 corresponding to activity A. The entry 202 may be created at, prior, or following the performance of activity A. For example, upon receiving a transaction request, entry 202 may be created. In another example, upon starting performance of activity A, entry 202 may be created. In yet another example, upon sending a request for another computing device to perform activity A, entry 202 may be created. Creating of an entry in a data structure and/or including data in the entry may also be referred to as inserting the entry into the data structure.

In the present example, the entry 202 includes an activity identifier corresponding to activity A, a timestamp, and a duration corresponding to activity A. In some examples, the activity identifier for activity A is unique, such that the activity may be uniquely identified across a plurality of computing devices. The timestamp may correspond to a start time of activity A. In some examples, the start time is the time that the entry 202 is created or to a time that a transaction request is received instructing a computing device to perform activity A. The duration corresponds to an amount of time between the start of the activity (i.e. the timestamp) and the completion time of the activity. Other information that may be included in the entry 202 includes a description of activity A. For example, if the activity corresponds to a database query, the description may include information regarding the query, the database queried, and so forth. The description may also include information regarding the transaction request corresponding to activity A, such as whether a response is requested for the transaction request or whether the transaction request is a one-way request in which a response is not expected.

The transaction fragment also includes an entry 204 corresponding to activity B and an entry 206 corresponding to activity C. These entries may be structured similarly to activity A. For example, each of the entries 204 and 206 also includes an activity identifier, timestamp, and duration information corresponding to the respective activities. Each entry may additionally include further description corresponding to the respective activity, as discussed above with respect to activity A.

In the present example, activity B and/or activity C may be performed on a different computing device than activity A. In the present example, the transaction fragment 200 is a transaction fragment of a first computing device upon which activities A and C are performed. Activity B corresponds to a transaction request that is sent to a second computing device, instructing the second computing device to perform activity B. FIG. 2B illustrates a transaction fragment corresponding to the second computing device upon which activity B is performed.

FIG. 2B illustrates an example layout of a transaction fragment at a second computing device, in accordance with various examples of the present disclosure. As is apparent from the illustrations, both the transaction fragment 200 of the first computing device and the second transaction fragment 201 of the second computing device may include an entry corresponding to activity B, which is performed on the second computing device.

The transaction fragment 201 includes an entry 208 corresponding to activity B. The entry 208 may be created at, prior, or following the performance of activity B. For example, the entry 208 may be created at the time a transaction request is received at the second computing device or at a time that the second computing device starts performing activity B.

In the present example, the entry 208 includes an identifier corresponding to activity B, a timestamp, and a duration corresponding to activity B. In some examples, the activity identifier for activity B is unique, such that the activity may be uniquely identified across a plurality of computing devices. For example, the entry 208 corresponding to activity B on the second computing device may include a same activity identifier as an activity identifier included in the entry 204 corresponding to activity B on a first computing device. Accordingly, the activity identifier of activity B on each computing device is consistent across the computing devices, such that activity B is uniquely distinguished from other activities.

In the present example, the timestamp in entry 208 for activity B may be different than the timestamp in entry 204 for activity B. For example, the first computing device may not have a clock that is synchronized with the second computing device. Each computing device may have a clock that is misaligned from the other computing devices by a particular amount of time. For example, there may be latency between the computing devices based on network delays and/or the clocks of the computing devices may have different time calibrations. Accordingly, the timestamp generated by the first computing device for entry 204 may be a different timestamp than the timestamp generated by the second computing device for the entry 208.

The transaction fragment 201 also includes an entry 210 corresponding to activity D. In the present example, activity D may be performed on a different computing device than activity B. For example, the second computing device may send a transaction request to a third computing device for the third computing device to perform activity D. Accordingly, the third computing device may also include a transaction fragment that includes an entry corresponding to activity D.

FIG. 2C illustrates an example layout of an aligned transaction fragment 211 at a management computing device, in accordance with various examples of the present disclosure.

The aligned transaction fragment 211 includes an entry 212 corresponding to activity A, an entry 214 corresponding to activity B, an entry 216 corresponding to activity C, and an entry 218 corresponding to activity D. These entries may also be referred to as nodes. The aligned transaction fragment 211 includes entries corresponding to all of the activities performed across the computing devices corresponding to a transaction. Accordingly, the aligned transaction fragment 211 may also be referred to as a master transaction fragment.

Each entry 212, 214, 216, and 218 in the transaction fragment 211 may include an activity identifier that matches the activity identifier of the transaction fragment (e.g., 200 or 201) that is received from other computing device. For example, the activity identifier of activity A may be consistent across the management computing device, the first computing device, and the second computing device. Accordingly, each activity of a transaction may be uniquely identified across the computing devices.

In the present example, the aligned transaction fragment 211 includes the information from the transaction fragments (e.g., transaction fragments 200 and 201) received from other computing devices. For example, the transaction fragment illustrated in FIG. 2A may be received from a first computing device and the transaction fragment illustrated in FIG. 2B may be received from a second computing device. Accordingly, the transaction fragments may be aggregated to form an aligned transaction fragment, which includes the activity entries from both transaction fragments. The alignment of the transactions fragments to form the aligned transaction fragment structure is discussed further with respect to FIGS. 3A and 3B.

The aligned transaction fragment 211 includes a data structure that may include one or more other data structures. In some examples, the data structure is a hierarchical data structure, such as a tree. In other examples, the aligned transaction fragment 211 may be stored in another data structure format, such as in one or more rows and/or columns of a database table, or as one or more strings separated by delimiters in a flat file.

Figure 3A:
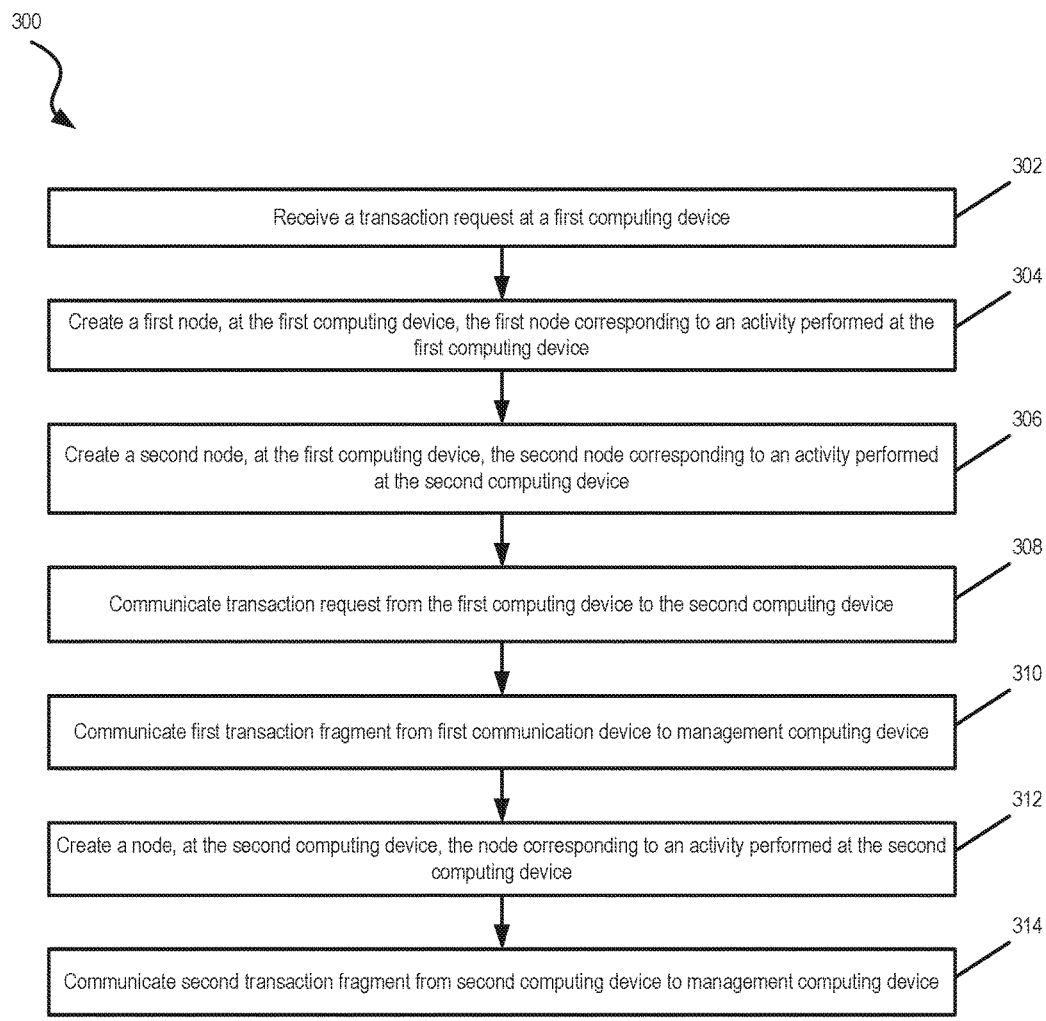
FIG. 3A is a flow diagram illustrating a method for aligning timestamps, in accordance with various examples of the present disclosure.

FIG. 3A illustrates a method 300 for aligning timestamps, in accordance with various examples of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. It is understood that additional steps can be provided before, during, and after the steps of method 300, and that some of the steps described can be replaced or eliminated in other examples of the method 300.

At action 302, a first computing device, such as a server, receives a transaction request from another computing device, such as a client. The transaction request may include any signal or message that may cause the first computing device to perform a transaction or a portion of a transaction. A transaction or a portion of a transaction may include any information processing activity. The information processing activity may be referred to as an activity.

At action 304, the first computing device performs a first activity corresponding to the transaction, and creates a first node corresponding to the first activity. The first node is created in a transaction fragment of the first computing device. In some examples, the first computing device associates a timestamp, a duration, and an activity identifier with the first node. The timestamp may correspond to a start time of the first activity, which may be a time that the first node is created, a time that the transaction request is received, or a time that a process is started to perform the first activity. The duration may include an amount of time to perform the first activity, as measured between the start time and a completion time corresponding to the first activity. The activity identifier may uniquely identify the first activity, such that the first computing device and other computing devices may identify the first activity based on the activity identifier.

At action 306, the first computing device determines that a second activity corresponding to the transaction is to be performed at a second computing device. For example, the first activity may trigger performance of the second activity. Accordingly, the first computing device creates a second node corresponding to the second activity. The second node is created in the transaction fragment of the first computing device. In some examples, the first computing device associates a timestamp, a duration, and an activity identifier with the second node. In some examples, the timestamp is a time that the second activity is triggered by the first activity, or a time that the first computing device sends a transaction request to the second computing device regarding the second activity.

At action 308, the first computing device communicates a transaction request to the second computing device. The transaction request may identify a particular activity to be performed, which in this example is the second activity. The transaction request may include the activity identifier corresponding to the second activity that is associated with the second node of the first computing device. The second computing device receives the transaction request.

At action 310, the first computing device communicates the transaction fragment including the first activity node and the second activity node to a management computing device. In the present example, the timestamp, duration, and activity identifier associated with each node is additionally included in the communication to the management computing device. The management computing device receives the transaction fragment.

The transaction fragment may be stored/cached at the first computing device until a criteria is met. When the criteria is met, the first computing device sends the transaction fragment to the management computing device. In some examples, the criteria is that a number of transaction fragments on the first computing devices reaches or exceeds a maximum number of transaction fragments, a maximum size of transaction fragment data is reached or exceeded, and/or a preconfigured time interval expires. In other examples, the transaction fragment is communicated from the first computing device to the management computing device after the transaction is complete. In yet other examples, the transaction fragment is communicated from the first computing device to the management computing device after an activity is completed or after a transaction request is communicated from the first computing device to another computing device (e.g., the second computing device).

At action 312, the second computing device performs the second activity corresponding to the transaction, and creates a node corresponding to the second activity. In some examples, the second computing device associates a timestamp, a duration, and an activity identifier with the node corresponding to the second activity. The timestamp may correspond to a start time of the first activity, which may be a time that the node is created, a time that the transaction request was received, or a time that a process is created to execute the second activity. The duration may include an amount of time to perform the second activity, as measured between the start time and a completion time corresponding to the second activity. The activity identifier may uniquely identify the second activity, such that the second computing device and other computing devices may uniquely identify the second activity based on the activity identifier. In the present example, the activity identifier for the second activity is based on the activity identifier specified in the transaction request from the first computing device.

At action 314, the second computing device communicates its transaction fragment, including the second activity node, to the management computing device. In the present example, the timestamp, duration, and activity identifier associated with each node in the data structure is additionally included in the communication to the management computing device. The management computing device receives the transaction fragment from the second computing device. As discussed with respect to action 310, the transaction fragment may be stored/cached on the second computing device until a criteria is met (e.g., the number of transaction fragments on the second computing devices reaches a maximum number of transaction fragments, a maximum transaction fragment size is reached, a time threshold is exceeded, and so forth). When the criteria is met, the second computing device sends the transaction fragment to the management computing device.

Figure 3B:
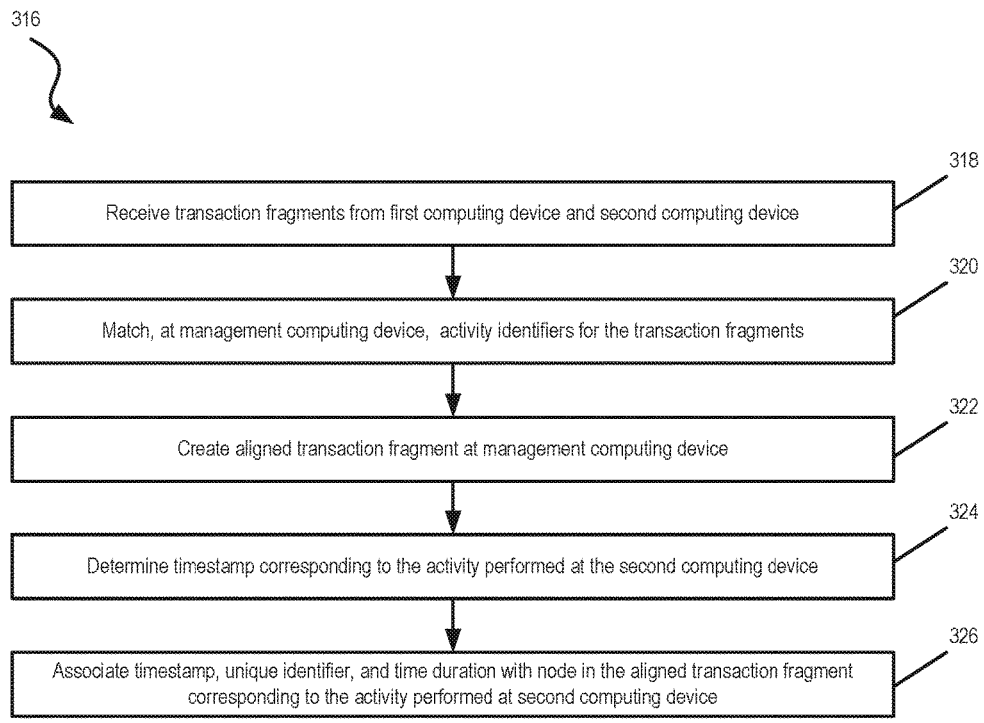
FIG. 3B is a flow diagram illustrating a method for aligning timestamps, in accordance with various examples of the present disclosure.

FIG. 3B illustrates a method 316 for aligning timestamps, in accordance with various examples of the present disclosure. The method 316 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. It is understood that additional steps can be provided before, during, and after the steps of method 316, and that some of the steps described can be replaced or eliminated in other examples of the method 316.

In the present example, the method 316 is performed at a management computing device, such as the management computing device described with respect to FIG. 3A that receives the transaction fragments from the first and the second computing devices. In, this example, the received transaction fragments are aggregated into an aligned transaction fragment. The aligned transaction fragment includes entries corresponding to the activities performed at all of the computing devices, and includes aligned timestamps corresponding to the activities.

At action 318, the management computing device receives the transaction fragments from the first computing device and the second computing device. This action may correspond to actions 310 and 314, as described with respect to FIG. 3A. Accordingly, as described with respect to action 310, the management computing device receives from the first computing device a first transaction fragment data structure that includes the first activity node, the second activity node, and the timestamp, duration, and activity identifiers associated with the first activity node and the second activity node. In addition, as described with respect to action 314, the management computing device receives from the second computing device a second transaction fragment data structure that includes a second activity node, and the timestamp, duration, and activity identifiers associated with the second activity node.

At action 320, the management computing device parses the activity identifiers of the nodes from the transaction fragments. The activity identifiers are compared to identify matching activity identifiers. In the present example, the management computing device determines that the activity identifier of the second activity node in the first transaction fragment is a match with the activity identifier of the second activity node in the second transaction fragment.

Accordingly, based on the match, at action 322 the management computing device may connect the transaction fragments at the second activity node to create an aligned transaction fragment at the management computing device. For example, as shown in FIGS. 2A, 2B, and 2C, the management computing device may connect the first data structure (shown in FIG. 2A) to the second data structure (shown in FIG. 2B) at the second activity node (e.g., entry 204/entry 208), at node 214 (shown in FIG. 2C).

In some examples, the connecting of the transaction fragments may include a copy of transaction fragment entries to a third transaction fragment structure, which may be referred to as an aligned transaction fragment. Nodes may be created/inserted into the aligned transaction fragment based on activity entries parsed from the first transaction fragment and the second transaction fragment. In other examples, the connecting of the transaction fragments may include using the first transaction fragment as a base, and inserting the entries from the second transaction into the first transaction fragment to form the aligned transaction fragment.

The aligned transaction fragment includes nodes corresponding to the first activity node and the second activity node. In some examples, the aligned transaction fragment data structure may be a hierarchical data structure, such as a tree, that includes the second activity node as a child node of the first activity node.

In some examples, nodes may be inserted into the aligned transaction fragment in a chronological or dependency order, such that the resulting data structure may be configured in a hierarchy that is structured based on dependency of the activities and/or a time ordering of the activities.

At action 324, the management computing device determines the timestamp to associate with the second activity in the node data structure. For example, the first transaction fragment may include a first timestamp corresponding to the second activity and the second transaction fragment received from the second computing device may include a second timestamp corresponding to the second activity. Accordingly, the timestamps may be determined by the management computing device to not be aligned.

In some examples, the timestamps may be aligned based on whether the second activity node indicates that the second activity corresponds to a one-way request or to a request-response request. A one-way request may be, for example, a transaction request that is sent from the first computing device to the second computing device without the first computing device having any expectation of receiving a response from the second computing device. A request-response request may be, for example, a transaction request from the first computing device to the second computing device, in which the first computing device expects a response from the second computing device.

The type of communication may be determined based on a description associated with the activity node. For example, the description may identify whether the transaction request corresponding to the activity was a one-way request or request-response request. In other examples, the communication type may be determined based on comparing a duration associated with the node in the first transaction fragment with the duration associated with the node in the second transaction fragment. The management computing device may infer that the communication is a request-response request if a duration associated with the node in the first transaction fragment is greater than the duration associated with the node in the second transaction fragment.

For a request-response request, the management computing device may align the timestamps of the activity node on the first computing device and on the second computing device by setting the aligned timestamp to be equal to the timestamp of the activity node of the sending computing device plus an offset. For example, the aligned timestamp for the second activity in the aligned transaction fragment may be set equal to the timestamp of the second activity in the first transaction fragment plus an offset.

For a request response request, the offset may be determined by subtracting the duration of the activity node of the receiving computing device from the duration of the activity node of the sending computing device to generate a subtracted duration, and dividing the subtracted duration by 2. For example, the duration corresponding to the second activity in the second fragment may be subtracted from the duration corresponding to the second activity in the first transaction fragment, and the result of the subtraction may be divided by two to generate the offset.

For a one-way request, the management computing device may align the timestamps of the activity node on the first computing device and on the second computing device by setting the aligned timestamp to be equal to the timestamp of the activity node of the sending computing device plus an offset. For example, the aligned timestamp for the second activity in the aligned transaction fragment may be set equal to the timestamp of the second activity in the first transaction fragment plus an offset. For a one-way request, the offset may be determined by querying a cache or other data store to receive the offset.

In some examples, the offset is queried from a database that includes one or more offsets. The input for the query may include location identifiers of the computing devices, such as server names, internet addresses, geographic addresses, and so forth.

In some examples, the offsets may be cached or otherwise stored in the data store from previous request response communications. For example, an offset determined for a request-response request between the first computing device and the second computing device may be stored, such that the offset may later be retrieved as the offset for the one-way communication request between the first computing device and the second computing device.

In some examples, for one-way requests, if there is no offset corresponding to the particular computing devices (e.g., the first computing device and the second computing device), an offset may be determined based on nearest geographic locations of the computing devices. For example, if the first computing device is located in a first geographic location (e.g., state, city, country, and so forth), and the second computing device is located in a second geographic location, then the first geographic location and the second geographic location may be input into a query to identify a stored offset corresponding to the geographic locations.

In some examples, the offsets determined for request-response requests may be associated with locations (e.g., geographic locations, internet locations, and so forth), such that these offsets may later be queried and used as the offsets for one-way requests. In other examples, the stored offset may include user-configured values.

Accordingly, as discussed above, an aligned timestamp may be determined for an activity node in the aligned transaction fragment by adjusting the timestamp of the activity node in a transaction fragment with the offset. The process may be recursively applied to each activity node, such that each activity node is aligned in the aligned transaction fragment. For example, another node may correspond to an activity that was communicated between the second computing device and a third computing device. Accordingly, the timestamp may be adjusted based on an offset between the first computing device and the second computing device, and then recursively adjusted again based on an offset between the second computing device and the third computing device. Accordingly, offsets may be propagated to the nodes to align timestamps between computing devices.

At action 326, for each node, the management computing devices associates the determined aligned timestamp corresponding to the node, the activity identifier corresponding to the node, the duration corresponding to the node, and any additional information corresponding to the node. In some examples, additional information may include further details regarding the activity performed.

Figure 4:
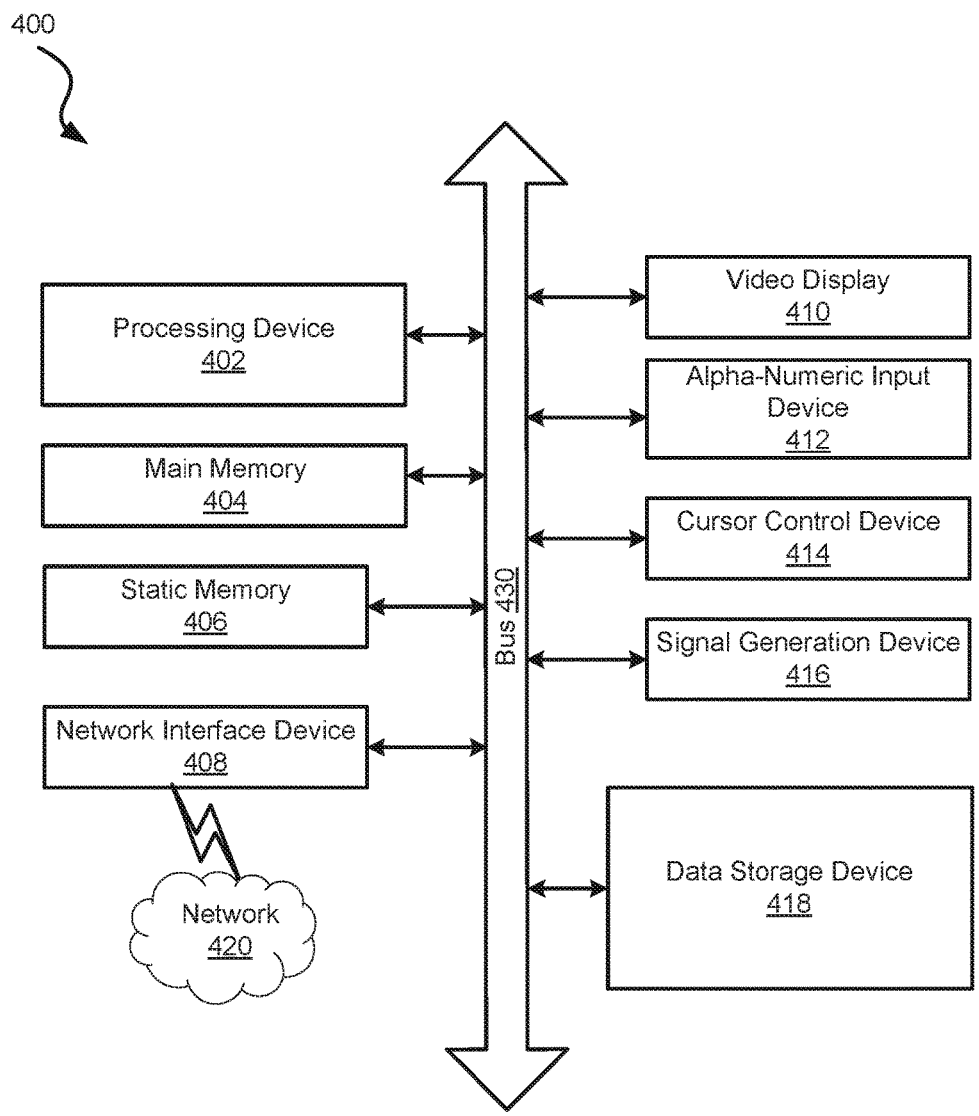
FIG. 4 is a block diagram illustrating a computer system that may perform one or more of the operations described herein.

FIG. 4 illustrates a diagram of a machine in the form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like.

More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "instantiating," "determining," "generating," "deploying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-implemented method, the method comprising:
    receiving, by a transaction application, a first entry from a first server, the first entry corresponding to an activity, wherein the first entry includes a first timestamp corresponding to the activity;
    receiving, by a transaction application, a second entry from a second server, the second entry including a second entry corresponding to the activity, wherein the second entry includes a second timestamp corresponding to the activity; and
    determining an aligned timestamp of the activity by adjusting the first timestamp or the second timestamp by an offset.

2. The computer-implemented method of claim 1, wherein the adjusting includes incrementing the first timestamp by the offset.

3. The computer-implemented method of claim 1, further comprising a first time duration corresponding to a first activity and a second time duration corresponding to a second activity, and wherein the offset is equal to one-half of a difference between the first time duration and the second time duration.

4. The computer-implemented method of claim 1, the method further comprising:
    querying a data store that includes one or more offsets, wherein an input of the query includes a first server identifier corresponding to the first server and a second server identifier corresponding to the second server.

5. The computer-implemented method of claim 4, wherein the first server identifier comprises at least one identifier selected from the group consisting of: (1) a geographic location identifier and (2) an internet address identifier.

6. The computer-implemented method of claim 1, further comprising:
    updating the aligned timestamp by adjusting one or more other timestamps corresponding to activities performed on one or more servers by the offset.

7. The computer-implemented method of claim 1, wherein the first timestamp corresponds to a start time of the activity.

8. The computer-implemented method of claim 1, where the third data structure is a tree data structure.

9. A non-transitory computer-readable medium comprising computer-readable instructions executable by a processor to cause the processor to:
    receive, by a transaction application, a first set of entries from a first server based on a first criterion and a second set of entries from a second server based on a second criterion, wherein each entry in the first set of entries and the second set of entries includes a corresponding identifier and a corresponding timestamp;
    identify a first entry including a first timestamp and a first identifier in the first set of entries and a second entry including a second timestamp and a second identifier in the second set of entries, wherein the first identifier matches with the second identifier; and
    determine an aligned timestamp for the first entry or the second entry.

10. The non-transitory computer-readable medium of claim 9, wherein the determining the aligned timestamp includes incrementing the first timestamp by an offset.

11. The non-transitory computer-readable medium of claim 10, wherein the offset is equal to one-half of a difference between the first timestamp and the second timestamp.

12. The non-transitory computer-readable medium of claim 9, wherein the offset is determined based on a query of a data store.

13. The non-transitory computer-readable medium of claim 12, wherein the query includes an input of at least one identifier corresponding to a computing device from which the first data structure or the second data structure is received, the at least one identifier selected from the group consisting of: a geographic location identifier and an internet address identifier.

14. A system comprising:
    a processor and a non-transitory computer-readable storage medium;
    a data structure stored in the non-transitory computer-readable storage medium, the data structure including a first entry received from a first computing device and a second entry received from a second computing device,
    wherein the first entry includes a first node corresponding to an activity, the first node comprising a first identifier and a first timestamp corresponding to the activity,
    wherein the second entry includes a second node corresponding to the activity, the second node comprising a second identifier and a second timestamp corresponding to the activity, the second timestamp being different than the first timestamp, and
    wherein the processor assigns a new timestamp, the new timestamp being incremented by an offset from the first timestamp, the offset received from a cache.

15. The system of claim 14, the processor further to receive the one or more offsets from a data store.

16. The system of claim 14, wherein the offset is half the difference between the first timestamp and the second timestamp.

17. The system of claim 14, further comprising a server including an application which aggregates one or more distributed transactions into an aligned transaction, the one or more distributed transactions corresponding to the activity.

18. The system of claim 17, wherein the one or more distributed transactions include one or more requests.

19. The non-transitory computer-readable medium of claim 9, wherein the corresponding timestamp includes an end time of an activity.

20. The system of claim 14, wherein the first timestamp includes an end time of the activity.

* * * * *